US011990300B2

(12) United States Patent
Kawaguchi et al.

(10) Patent No.: US 11,990,300 B2
(45) Date of Patent: May 21, 2024

(54) ELECTROMAGNETIC RELAY

(71) Applicant: OMRON Corporation, Kyoto (JP)

(72) Inventors: Naoki Kawaguchi, Kyoto (JP); Takeshi Nishida, Kyoto (JP); Ryota Minowa, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/689,989

(22) Filed: Mar. 9, 2022

(65) Prior Publication Data

US 2022/0293375 A1 Sep. 15, 2022

(30) Foreign Application Priority Data

Mar. 15, 2021 (JP) ................................ 2021-041699

(51) Int. Cl.
*H01H 50/12* (2006.01)
*H01H 50/54* (2006.01)
*H01H 45/12* (2006.01)

(52) U.S. Cl.
CPC ............ *H01H 50/12* (2013.01); *H01H 50/54* (2013.01); *H01H 45/12* (2013.01)

(58) Field of Classification Search
CPC ......... H01H 50/12; H01H 73/18; H01H 45/12
USPC .................................. 335/201, 156, 133, 83
See application file for complete search history.

(56) References Cited

U.S. PATENT DOCUMENTS

| | | | | |
|---|---|---|---|---|
| 3,805,200 A * | 4/1974 | Suzuki | H01H 9/38 335/201 |
| 4,393,288 A * | 7/1983 | Belttary | H01H 73/18 218/155 |
| 6,700,466 B1 * | 3/2004 | Yamamoto | H01H 9/302 335/201 |
| 6,911,884 B2 * | 6/2005 | Uotome | H01H 50/36 335/132 |

(Continued)

FOREIGN PATENT DOCUMENTS

| | | |
|---|---|---|
| JP | 2014-130689 A | 7/2014 |
| JP | 2016-24864 A | 2/2016 |

(Continued)

OTHER PUBLICATIONS

The Office Action for the corresponding Korean application No. 10-2022-0009000, issued on Mar. 8, 2024.

*Primary Examiner* — Alexander Talpalatski
(74) *Attorney, Agent, or Firm* — SHINJYU GLOBAL IP

(57) ABSTRACT

An electromagnetic relay includes a case including a base, a first fixed terminal held by the base, a movable contact piece, a gas inflow space, and a gas passage. The first fixed terminal includes a first fixed contact disposed apart from the base in a first direction inside the case, a contact support portion disposed between the first fixed contact and the base and configured to support the first fixed contact, and a first extending portion extending at an angle from the contact support portion and penetrating the base in the first direction. The movable contact piece includes a first movable contact facing the first fixed contact in the first direction. The gas inflow space is formed between the base and the contact support portion inside the case. The gas passage penetrates the base in the first direction and communicates the gas inflow space with an outside of the case.

7 Claims, 12 Drawing Sheets

(56) References Cited

U.S. PATENT DOCUMENTS

| | | | | |
|---|---|---|---|---|
| 8,179,217 | B2 * | 5/2012 | Kawaguchi | H01H 51/2209 335/85 |
| 8,383,975 | B2 * | 2/2013 | Lin | H01H 9/02 200/409 |
| 8,803,642 | B2 * | 8/2014 | Imamura | H01H 69/00 335/131 |
| 8,952,772 | B2 * | 2/2015 | Imamura | H01H 50/54 335/131 |
| 9,147,538 | B2 * | 9/2015 | Cho | H01H 9/30 |
| 9,378,906 | B2 * | 6/2016 | Imamura | H01H 33/04 |
| 11,170,961 | B2 * | 11/2021 | Minowa | H01H 50/04 |
| 11,476,068 | B2 * | 10/2022 | Mori | H01H 50/12 |
| 2004/0027776 | A1 | 2/2004 | Uotome et al. | |
| 2008/0073326 | A1 * | 3/2008 | Asokan | H01H 9/342 218/35 |
| 2019/0157030 | A1 | 5/2019 | Sunohara et al. | |

FOREIGN PATENT DOCUMENTS

| | | | |
|---|---|---|---|
| JP | 2019-96460 | A | 6/2019 |
| KR | 10-0505438 | B1 | 7/2005 |

* cited by examiner

ELECTROMAGNETIC RELAY

This application claims priority to Japanese Patent Application No. 2021-041699, filed Mar. 15, 2021. The contents of that application are incorporated by reference herein in their entirety.

FIELD

The present invention relates to an electromagnetic relay.

BACKGROUND

In an electromagnetic relay, an arc is generated at the contacts when the current is cut off. When the temperature of the contacts rises due to this arcing, the contacts may melt, leading to the generation of a high-temperature gas containing metal vapor. If this high temperature gas remains in the vicinity of the contacts, the insulation performance between the contacts deteriorates and re-ignition of the arc may occur. In order to prevent re-ignition of the arc, the electromagnetic relay disclosed in Japanese Unexamined Patent Application Publication No. 2016-24864 includes a case in which are provided an arc-extinguishing space for extinguishing the arc, a gas inflow space separate from the arc-extinguishing space, and a gas passage that allows high-temperature gas to escape from the arc-extinguishing space to the gas inflow space.

SUMMARY

In the electromagnetic relay of Japanese Unexamined Patent Application Publication No. 2016-24864, the inlet and outlet of the gas passage are disposed in the vicinity of the contacts. Therefore, the high temperature gas easily returns to the contacts through the gas passage. As the load capacity increases, the amount of hot gas returning to the vicinity of the contacts also increases, and so there is a risk of re-ignition of the arc.

An object of the present invention is to prevent re-ignition of an arc generated at contacts in an electromagnetic relay.

The electromagnetic relay according to one aspect of the present invention includes a case, a first fixed terminal, a movable contact piece, a gas inflow space, and a gas passage. The case includes a base. The first fixed terminal is held by the base. The first fixed terminal includes a first fixed contact disposed apart from the base in a first direction inside the case, a contact support portion dispose between the first fixed contact and the base and configured to support the first fixed contact, and a first extending portion that extends at an angle from the contact support portion and penetrates the base in the first direction. The movable contact piece includes a first movable contact facing the first fixed contact in the first direction. The gas inflow space is formed between the base and the contact support portion inside the case. The gas passage penetrates the base in the first direction and communicates the gas inflow space with an outside of the case.

In this electromagnetic relay, the gas inflow space is disposed between the base and the contact support portion configured to support the first fixed contact and communicates from the base to the outside of the case by the gas passage. With this configuration, since the gas inflow space and the gas passage can be disposed in the vicinity of the first fixed contact, the high temperature gas arising from an arc generated between the first fixed contact and the first movable contact can be efficiently allowed to escape from the gas passage to the outside of the case. Thereby, it is possible to prevent re-ignition of an arc generated between the first fixed contact and the first movable contact.

The first fixed terminal may further include a second extending portion disposed facing the first extending portion in a second direction orthogonal to the first direction and penetrating the base in the first direction. The contact support portion may be disposed between the first extending portion and the second extending portion. The gas passage may be disposed between the first extending portion and the second extending portion. Even in this case, the high temperature gas arising from the arc generated between the first fixed contact and the first movable contact can be efficiently allowed to escape from the gas passage to the outside of the case.

The base may include a terminal support portion that supports the contact support portion of the first fixed terminal. The gas inflow space may be formed in the terminal support portion. In this case, since the gas inflow space and the gas passage are formed near the first fixed contact, the high temperature gas arising from the arc generated between the first fixed contact and the first movable contact can be efficiently allowed to escape from the gas passage to the outside of the case.

The gas inflow space may be disposed adjacent to the terminal support portion. In this case, it is possible to further prevent the re-ignition of an arc generated at the contacts.

The first fixed contact may include a caulked portion fixed to the first fixed terminal by caulking. The caulked portion may be disposed in the gas inflow space. In this case, the gas inflow space can be used as a space that lets the caulked portion escape.

The gas inflow space may be open toward a longitudinal direction of the movable contact piece. In this case, high temperature gas arising from an arc is easily guided to the gas inflow space.

The first fixed terminal may further include an external connection portion disposed on the first extending portion outside the case. The base may include a standoff portion protruding toward the external connection portion. In this case, it is possible to prevent the gas passage from being blocked when the external connection portion is connected to an external device.

The electromagnetic relay may further include a magnet configured to elongate an arc generated between the first fixed contact and the first movable contact in a direction from the contact support portion toward the first extending portion. In this case, since the arc moves along the first extending portion, hot gas produced by the arc can be more effectively allowed to escape from the gas passage to the outside of the case.

The electromagnetic relay may further include a second fixed terminal that has a second fixed contact. The movable contact piece may further include a second movable contact that faces the second fixed contact in the first direction. In this case, in an electromagnetic relay having a second fixed terminal, re-ignition of an arc generated at contacts can be prevented.

DETAILED DESCRIPTION

Hereinbelow, an embodiment of an electromagnetic relay according to one aspect of the present invention will be described with reference to the drawings. Note that in each drawing, the X1 direction will be described as the left direction, the X2 direction as the right direction, the Y1 direction as the front direction, the Y2 direction as the rear direction, the Z2 direction as the upward direction, and the Z1 direction as the downward direction. In the present embodiment, the up-down direction is an example of the first direction, and the front-rear direction is an example of the second direction. It should be noted that these directions are defined for convenience of explanation, and do not limit the arrangement direction of the electromagnetic relay.

Figure 1:
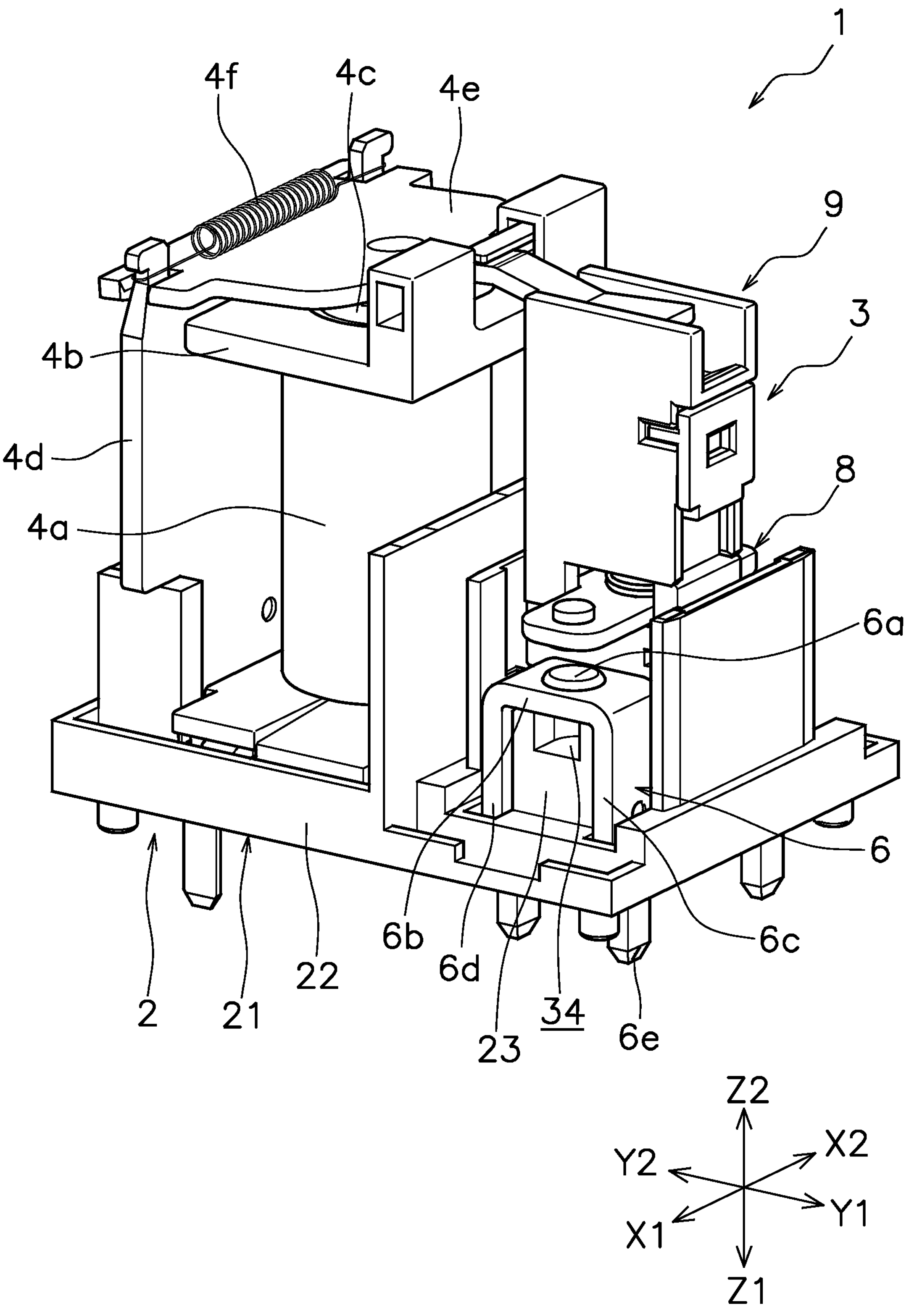
FIG. 1 is a perspective view of an electromagnetic relay.
Figure 2:
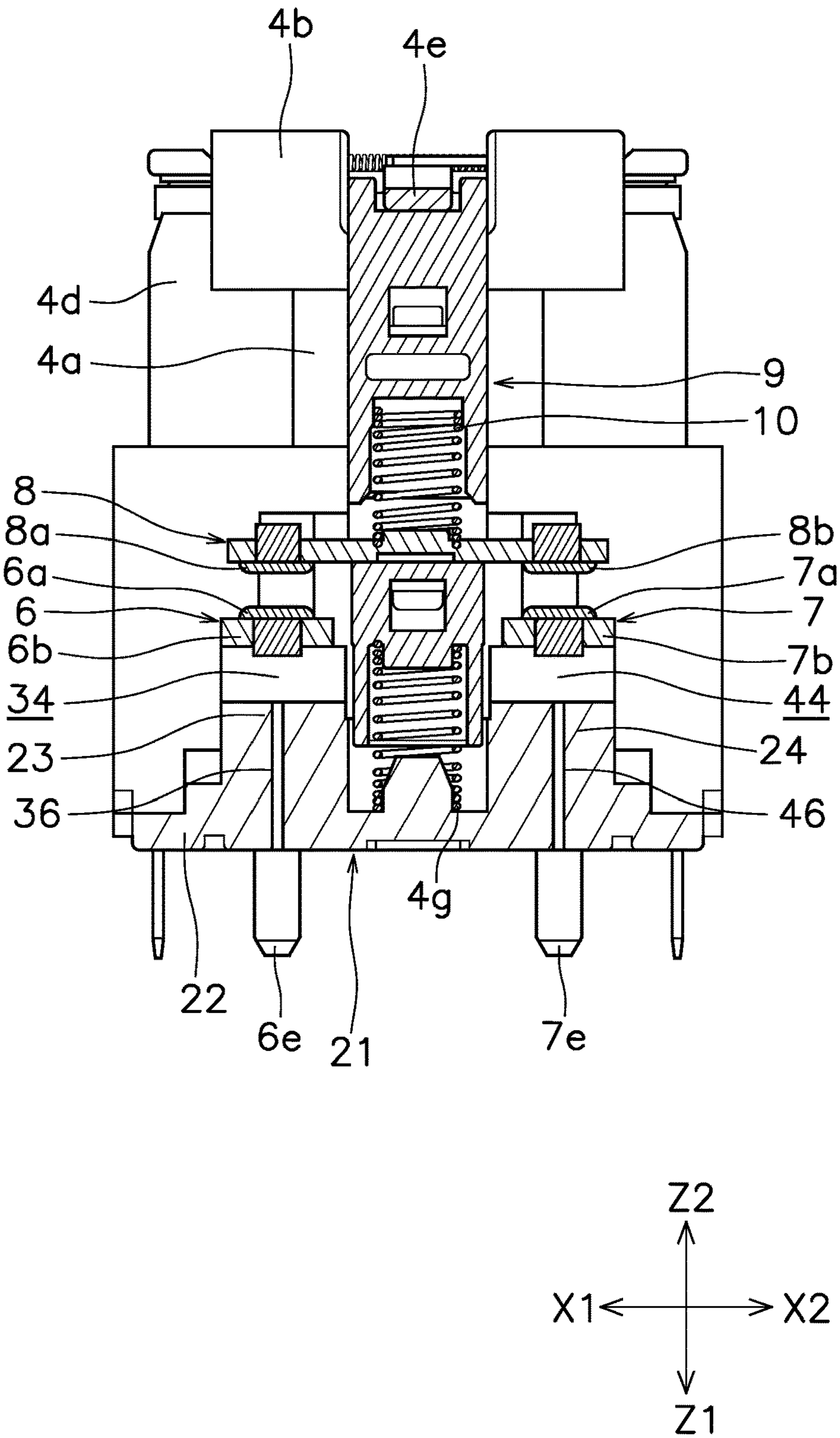
FIG. 2 is a cross-sectional view of a contact device cut along a plane orthogonal to the front-rear direction.
Figure 5:
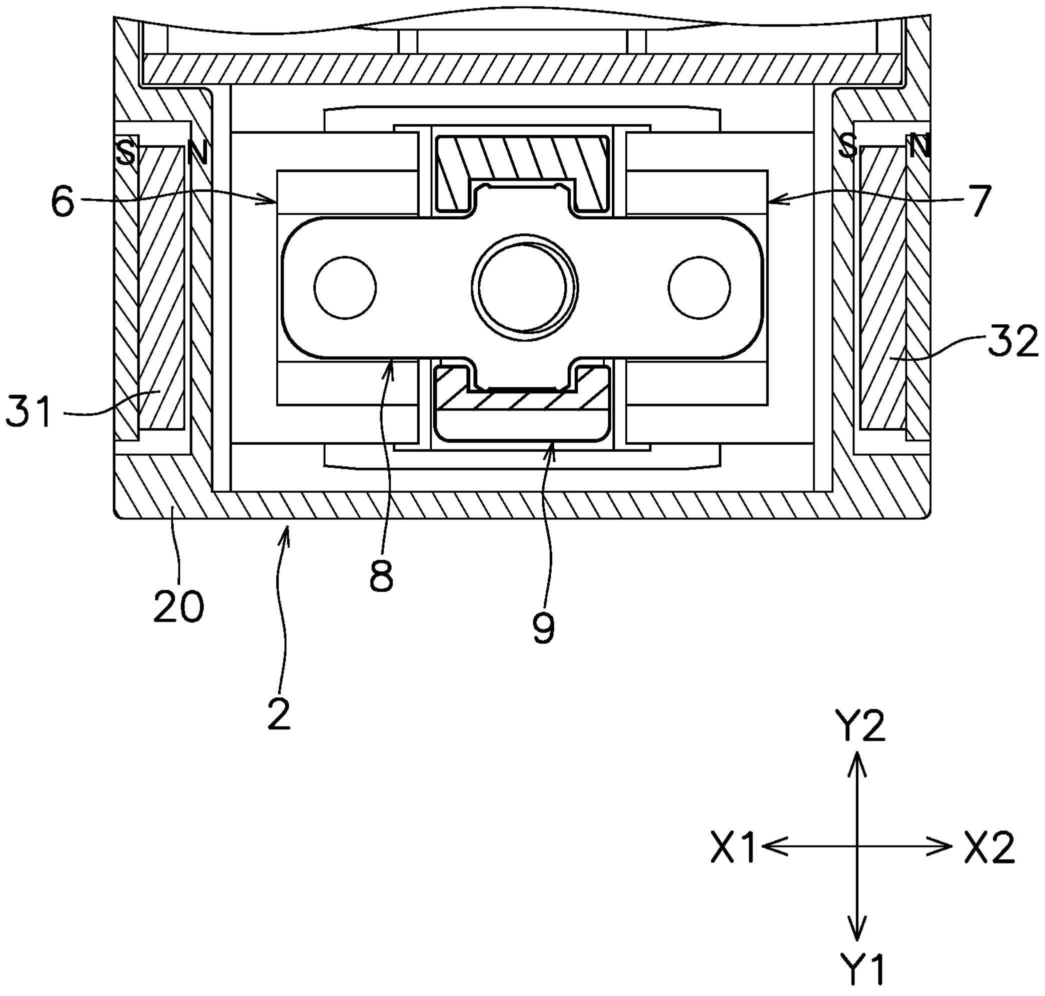
FIG. 5 is a partial cross-sectional view of the electromagnetic relay cut along a plane orthogonal to the up-down direction.

As shown in FIGS. 1 and 2, the electromagnetic relay 1 includes a case 2, a contact device 3, and a drive device 4. The case 2 is made of an insulating material such as resin. The case 2 includes a case body 20 (see FIG. 5) and a base 21. The case body 20 has a substantially quadrangular box shape that opens downward, and is attached to the base 21 so as to cover the base 21 from above. The base 21 has a rectangular shape when viewed from the up-down direction. The base 21 supports the contact device 3 and the drive device 4.

FIG. 2 is a cross-sectional view of the contact device 3 cut along a plane orthogonal to the front-rear direction. As shown in FIGS. 1 and 2, the base 21 includes a bottom portion 22 and terminal support portions 23, 24. The bottom portion 22 is substantially plate shaped and extends in the left-right direction and the front-rear direction. The terminal support portions 23 and 24 are formed so as to protrude upward from the bottom portion 22. The terminal support portion 23 is disposed apart from the terminal support portion 24 in the left-right direction. The upper surfaces of the terminal support portions 23 and 24 include flat surfaces orthogonal to each other in the up-down direction.

Figure 3:
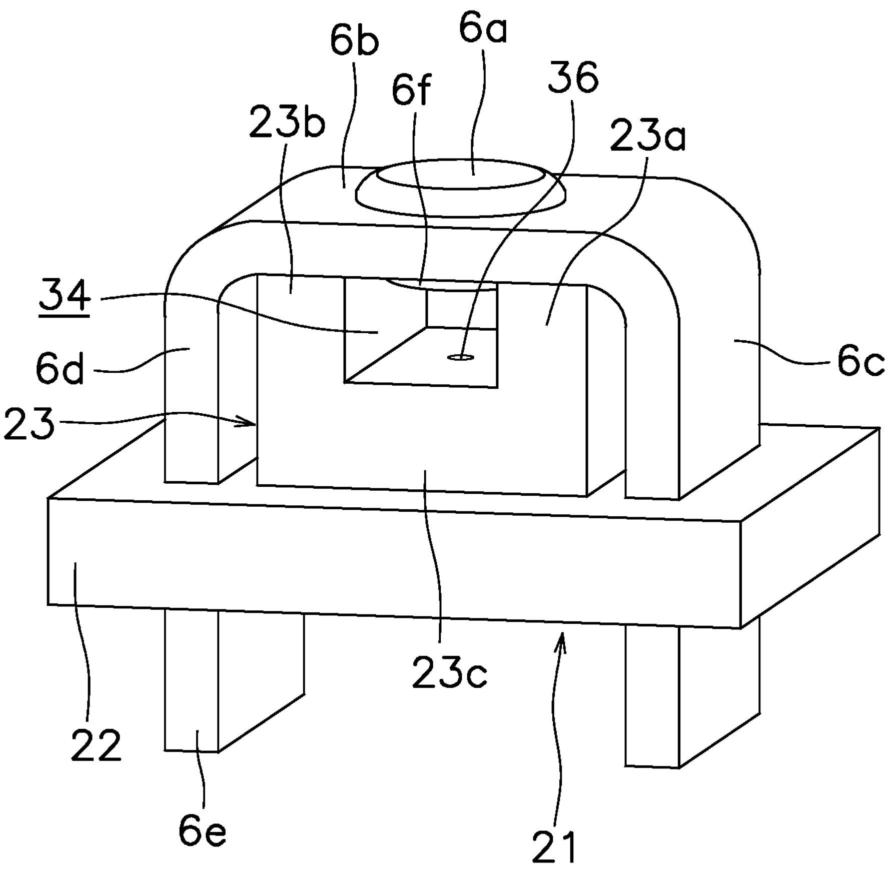
FIG. 3 is a perspective view of a periphery of a terminal support portion.
Figure 4:
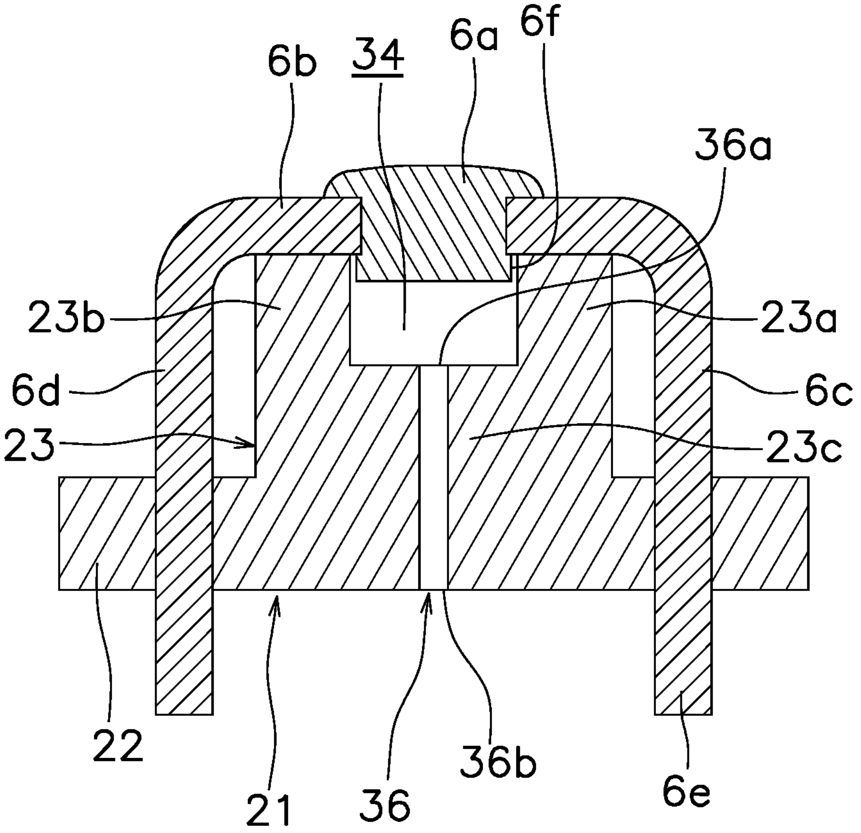
FIG. 4 is a cross-sectional view of the periphery of the terminal support portion.
Figure 4:
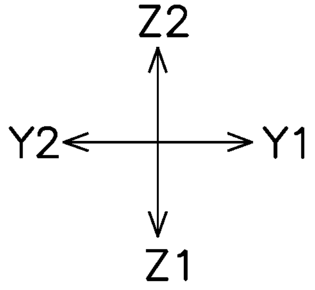

FIG. 3 is a perspective view of the periphery of the terminal support portion 23. FIG. 4 is a cross-sectional view of the periphery of the terminal support portion 23. As shown in FIGS. 3 and 4, the terminal support portion 23 includes a first support portion 23*a*, a second support portion 23*b*, and a connection portion 23*c*. The first support portion 23*a* and the second support portion 23*b* extend upward from the bottom portion 22. The first support portion 23*a* and the second support portion 23*b* extend upward above the connection portion 23*c*. The first support portion 23*a* faces the second support portion 23*b* in the front-rear direction. The connection portion 23*c* extends upward from the bottom portion 22 between the first support portion 23*a* and the second support portion 23*b*. The connection portion 23*c* is connected to the lower end of the first support portion 23*a* and the lower end of the second support portion 23*b*.

The terminal support portion 24 is left-right symmetrical with the terminal support portion 23, and includes components corresponding to the first support portion 23*a*, the second support portion 23*b*, and the connection portion 23*c* of the terminal support portion 23. A detailed description of the terminal support portion 24 will therefore be omitted.

The contact device 3 includes a first fixed terminal 6, a second fixed terminal 7, a movable contact piece 8, a movable member 9, and a contact spring 10. The first fixed terminal 6, the second fixed terminal 7, and the movable contact piece 8 are plate-shaped terminals and are made of a conductive material such as copper.

The first fixed terminal 6 and the second fixed terminal 7 each have a U-shaped cross section, and when viewed from the left-right direction have a shape bent in a U-shape. The first fixed terminal 6 and the second fixed terminal 7 are held by the base 21. The first fixed terminal 6 and the second fixed terminal 7 are fixed by being press-fitted into, for example, the base 21.

The first fixed terminal 6 includes a first fixed contact 6*a*, a contact support portion 6*b*, a first extending portion 6*c*, a second extending portion 6*d*, and a pair of external connection portions 6*e*. The first fixed contact 6*a* is disposed inside the case 2 so as to be separated from the base 21 in the up-down direction. The first fixed contact 6*a* is disposed above the contact support portion 6*b*. The first fixed contact 6*a* includes a caulked portion 6*f* that is fixed by being caulked to the first fixed terminal 6. The caulked portion 6*f* protrudes downward from the contact support portion 6*b*.

The contact support portion 6*b* is disposed between the first extending portion 6*c* and the second extending portion 6*d*. The contact support portion 6*b* is supported on the upper surface of the first support portion 23*a* and the upper surface of the second support portion 23*b* in the terminal support portion 23. The contact support portion 6*b* extends in a direction orthogonal to the up-down direction. The contact support portion 6*b* supports the first fixed contact 6*a*. The first fixed contact 6*a* is fixed by being caulked to the contact support portion 6*b*. Note that the first fixed contact 6*a* may also be integrated with the first fixed terminal 6.

The first extending portion 6*c* and the second extending portion 6*d* are press-fitted and fixed to the bottom portion 22 of the base 21. The first extending portion 6*c* is connected to the contact support portion 6*b* and protrudes outward from the case 2. The first extending portion 6*c* is bent downward from the front end of the contact support portion 6*b* and penetrates the bottom portion 22 of the base 21 in the up-down direction. The connection portion between the first extending portion 6*c* and the contact support portion 6*b* has a curved shape (R-shape). The first extending portion 6*c* is in contact with the front surface of the terminal support portion 23.

The second extending portion 6*d* faces the first extending portion 6*c* in the front-rear direction. The second extending portion 6*d* is connected to the contact support portion 6*b* and protrudes outward from the case 2. The second extending portion 6*d* is bent downward from the rear end of the contact support portion 6*b* and penetrates the bottom portion 22 of the base 21 in the up-down direction. The connection portion between the second extending portion 6*d* and the contact support portion 6*b* has a curved shape (R-shape). The second extending portion 6*d* is in contact with the rear surface of the terminal support portion 23.

The pair of external connection portions 6*e* are respectively disposed at the lower end of the first extending portion 6*c* and the lower end of the second extending portion 6*d*, and are electrically connected to an external device (not shown).

The second fixed terminal 7 is disposed apart from the first fixed terminal 6 in the left-right direction. The second fixed terminal 7 has a shape similar to that of the first fixed terminal 6. The second fixed terminal 7 includes a second fixed contact 7*a*, a contact support portion 7*b*, a first extending portion 7*c*, a second extending portion 7*d*, and a pair of external connection portions 7*e*. The second fixed contact 7*a* includes a caulked portion (not shown). Since each configuration of the second fixed terminal 7 is the same as each corresponding configuration of the first fixed terminal 6, descriptions thereof will be omitted.

The movable contact piece 8 extends in the left-right direction. The longitudinal direction of the movable contact piece 8 coincides with the left-right direction. The lateral direction of the movable contact piece 8 coincides with the front-rear direction. The movable contact piece 8 is disposed above the first fixed terminal 6 and the second fixed terminal 7.

The movable contact piece 8 includes a first movable contact 8*a* and a second movable contact 8*b*. The first movable contact 8*a* faces the first fixed contact 6*a* in the up-down direction and is contactable with the first fixed contact 6*a*. The second movable contact 8*b* faces the second fixed contact 7*a* in the up-down direction and is contactable with the second fixed contact 7*a*. In the present embodiment, the first movable contact 8*a* and the second movable contact 8*b* are fixed by being caulked to the movable contact piece 8. However, a configuration is possible in which the first movable contact 8*a* and the second movable contact 8*b* are integrated with the movable contact piece 8.

The movable contact piece 8 is movable in moving direction including a Z1 direction from the first movable contact 8*a* toward the first fixed contact 6*a* and a Z2 direction from the first fixed contact 6*a* toward the first movable contact 8*a*. In the present embodiment, the movable contact piece 8 is movable in the up-down direction. The movable contact piece 8 is coupled to the movable member 9. The movable contact piece 8 penetrates the movable member 9 in the left-right direction. The movable contact piece 8 is relatively movable with respect to the movable member 9 in the up-down direction.

The movable member 9 holds the movable contact piece 8. The movable member 9 extends in the up-down direction. The movable member 9 is disposed at the center of the movable contact piece 8 in the left-right direction. The movable member 9 is made of an insulating material such as resin. The movable member 9 is coupled, at the upper end, to the drive device 4. The movable member 9 is movable in the up-down direction.

The contact spring 10 is a coil spring, and biases the movable contact piece 8 in the contact direction (downward in the present embodiment). The contact spring 10 is accommodated inside the movable member 9.

The drive device 4 is disposed to the rear of the contact device 3. The drive device 4 moves the movable contact piece 8 in the up-down direction via the movable member 9. The drive device 4 includes a coil 4*a*, a spool 4*b*, a fixed iron core 4*c*, a yoke 4*d*, a movable iron piece 4*e*, a hinge spring 4*f*, and a return spring 4*g*.

The coil 4*a* is wound around the outer circumference of the spool 4*b*. The spool 4*b* extends in the up-down direction. The fixed iron core 4*c* is disposed in the inner peripheral portion of the spool 4*b*. The yoke 4*d* is disposed so as to cover the rear of the coil 4*a*. The yoke 4*d* is substantially L-shaped when viewed from the left-right direction. The yoke 4*d* is connected to the lower end of the fixed iron core 4*c*.

The movable iron piece 4*e* is rotatably supported by the yoke 4*d* via the hinge spring 4*f*. The movable iron piece 4*e* rotates with the upper end of the yoke 4*d* as a fulcrum. The movable iron piece 4*e* has a front end that is disposed on the upper part of the movable member 9. The movable iron piece 4*e* is disposed above the fixed iron core 4*c*. The hinge spring 4*f* biases the movable iron piece 4*e* in a direction away from the fixed iron core 4*c*. The return spring 4*g* is disposed between the base 21 and the movable member 9. The return spring 4*g* biases the movable member 9 in the opening direction (upward in the present embodiment).

Here, the operation of the electromagnetic relay 1 will be described. In a state where no voltage is applied to the coil 4*a*, the movable member 9 is pressed in the opening direction by the restoring forces of the hinge spring 4*f* and the return spring 4*g*. For this reason, the first movable contact 8*a* separates from the first fixed contact 6*a*, and the second movable contact 8*b* separates from the second fixed contact 7*a*.

When a voltage is applied to the coil 4*a* whereby the drive device 4 is excited, the movable iron piece 4*e* is attracted to the fixed iron core 4*c* and rotates, and the movable iron piece 4*e* presses the movable member 9 in the contact direction. As a result, the movable member 9 moves in the contact direction against the restoring forces of the hinge spring 4*f* and the return spring 4*g*. As the movable member 9 moves in the contact direction, the contact spring 10 moves in the contact direction. Thereby, the movable contact piece 8 moves in the contact direction, whereby the first movable contact 8*a* comes into contact with the first fixed contact 6*a*, and the second movable contact 8*b* comes into contact with the second fixed contact 7*a*. When the application of the voltage of the coil 4*a* is stopped, the movable member 9 moves in the opening direction by the restoring forces of the hinge spring 4*f* and the return spring 4*g*.

The electromagnetic relay 1 further includes a first magnet 31, a second magnet 32, a gas inflow space 34, and a gas passage 36.

The first magnet 31 and the second magnet 32 are permanent magnets. The first magnet 31 and the second magnet 32 are disposed so that magnetic flux flows in the left-right direction between the first fixed contact 6*a* and the first movable contact 8*a* and between the second fixed contact 7*a* and the second movable contact 8*b*. The first magnet 31 and the second magnet 32 are disposed so that different poles face each other in the left-right direction. In the present embodiment, the first magnet 31 and the second magnet 32 are arranged with different poles facing each other so that magnetic flux flows from the first magnet 31 toward the second magnet 32. The first magnet 31 and the second magnet 32 are mounted on the outer peripheral surface of the case 2.

For example, when a current flows from the first movable contact 8*a* to the first fixed contact 6*a*, a forward Lorentz force acts on the arc generated between the first fixed contact 6*a* and the first movable contact 8*a*. The arc is elongated in the direction from the contact support portion 6*b* toward the first extending portion 6*c*. On the other hand, when a current flows from the first fixed contact 6*a* to the first movable contact 8*a*, a rearward Lorentz force acts on the arc.

The gas inflow space 34 is defined inside the case 2 between the base 21 and the contact support portion 6*b* of the first fixed terminal 6. The gas inflow space 34 is defined in the terminal support portion 23. In the present embodiment, the gas inflow space 34 penetrates the terminal support portion 23 in the left-right direction between the first support portion 23*a* and the second support portion 23*b* of the terminal support portion 23, and the gas inflow space 34 is a space defined by a recess that opens upward. The gas inflow space 34 is disposed adjacent to the terminal support portion 23 in the up-down direction. The gas inflow space 34 is disposed in the lower part of the terminal support portion 23, with the upper part being covered by the terminal support portion 23. The gas inflow space 34 overlaps the terminal support portion 23 and the first fixed contact 6*a* in the up-down direction. The caulked portion 6*f* of the first fixed contact 6*a* is disposed in the gas inflow space 34, and the gas inflow space 34 also serves as a space for allowing the caulked portion 6*f* to escape.

The gas passage 36 penetrates the base 21 in the up-down direction and communicates with the gas inflow space 34 and the outside of the case 2. The gas passage 36 is a passage for allowing the high-temperature gas arising from an arc generated between the first fixed contact 6*a* and the first movable contact 8*a* to escape to the outside of the case 2. In the present embodiment, the gas passage 36 is constituted by a circular through hole that penetrates the terminal support portion 23 and the bottom portion 22 of the base 21 in the up-down direction. The gas passage 36 overlaps the first fixed contact 6*a* and the contact support portion 6*b* in the up-down direction. The gas passage 36 is disposed below the first fixed contact 6*a* and the contact support portion 6*b*. The gas passage 36 is disposed between the first extending portion 6*c* and the second extending portion 6*d* of the first fixed terminal 6 in the front-rear direction.

The gas passage 36 includes an inflow port 36*a* and an outflow port 36*b*. The inflow port 36*a* is disposed in the connection portion 23*c* of the terminal support portion 23 and opens upward. The outflow port 36*b* is formed at the bottom portion 22 of the base 21 and opens downward.

As shown in FIG. 2, the electromagnetic relay 1 further includes a gas inflow space 44 disposed on the second fixed terminal 7 side and a gas passage 46. The gas passage 46 is a passage for allowing the high-temperature gas arising from the arc generated between the second fixed contact 7*a* and the second movable contact 8*b* to escape to the outside of the case 2. The configuration of the gas inflow space 44 and the gas passage 46 resembles that of the gas inflow space 34 and the gas passage 36 except for being disposed on the second fixed terminal 7 side, so descriptions thereof will be omitted.

In this electromagnetic relay 1, the gas inflow space 34 is defined between the base 21 and the contact support portion 6*b* that supports the first fixed contact 6*a*, and communicates from the base 21 to the outside of the case 2 by the gas passage 36. Therefore, since the gas inflow space 34 and the gas passage 36 are disposed in the vicinity of the first fixed contact 6*a*, the high temperature gas arising from the arc generated between the first fixed contact 6*a* and the first movable contact 8*a* can be efficiently allowed to escape from the gas passage 36 to the outside of the case 2. Thereby, it is possible to prevent re-ignition of an arc generated between the first fixed contact 6*a* and the first movable contact 8*a*. Note that, for an arc generated between the second fixed contact 7*a* and the first movable contact 8*a*, re-ignition can be prevented by the gas inflow space 44 and the gas passage 46.

In the present embodiment, since the first extending portion 6*c* and the second extending portion 6*d* are disposed in the direction in which the arc is elongated, the arc moves along the first extending portion 6*c* or the second extending portion 6*d*. Since the gas inflow space 34 is disposed in the vicinity of the first extending portion 6*c* and the second extending portion 6*d*, it is possible to more effectively allow the high-temperature gas generated by the arc to escape from the gas passage 36 to the outside of the case 2.

While a preferred embodiment of the electromagnetic relay according to one aspect of the present invention has been described above, it should be understood that the present invention is not limited to the above embodiment, and various changes can be made without departing from the gist of the invention. For example, the constitution of the contact device 3 or the drive device 4 may be changed.

The shape of the first fixed terminal 6 may be changed. The first fixed terminal 6 may have an L-shaped cross section. For example, either the first extending portion 6*c* or the second extending portion 6*d* may be omitted. The first extending portion 6*c* and the second extending portion 6*d* protrude downward from the bottom portion 22 of the base 21 in the above embodiment, but only one of the first extending portion 6*c* or the second extending portion 6*d* may protrude downward from the bottom portion 22 of the base 21.

Figure 6:
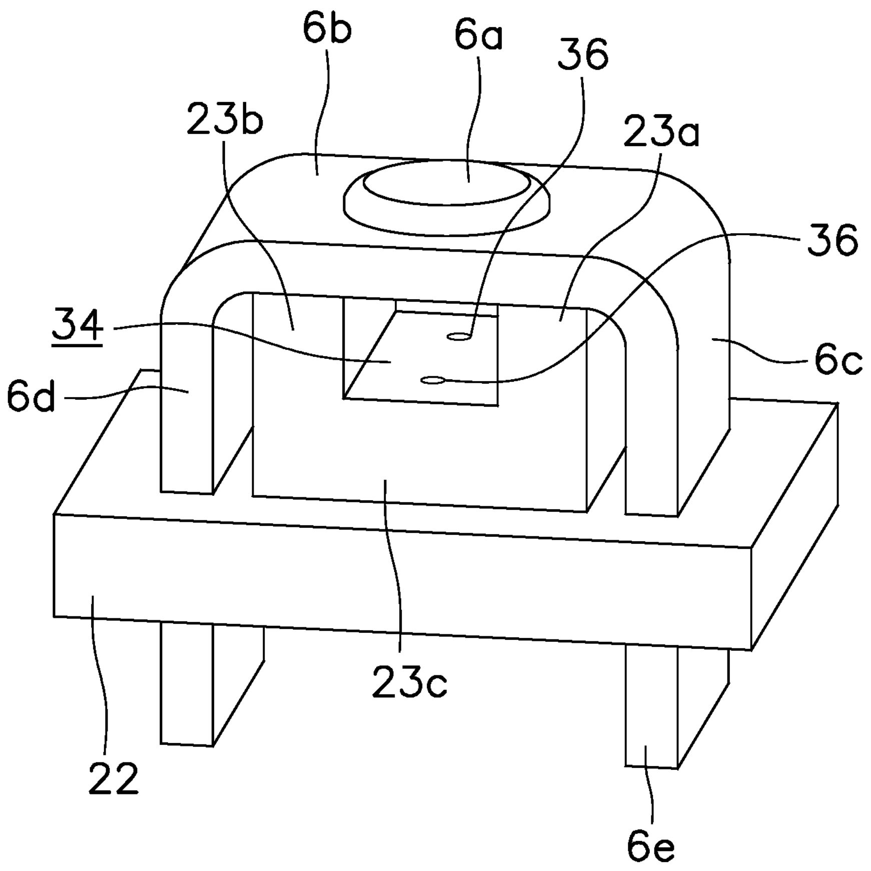
FIG. 6 is a perspective view of the periphery of a terminal support portion according to a modified example.
Figure 7:
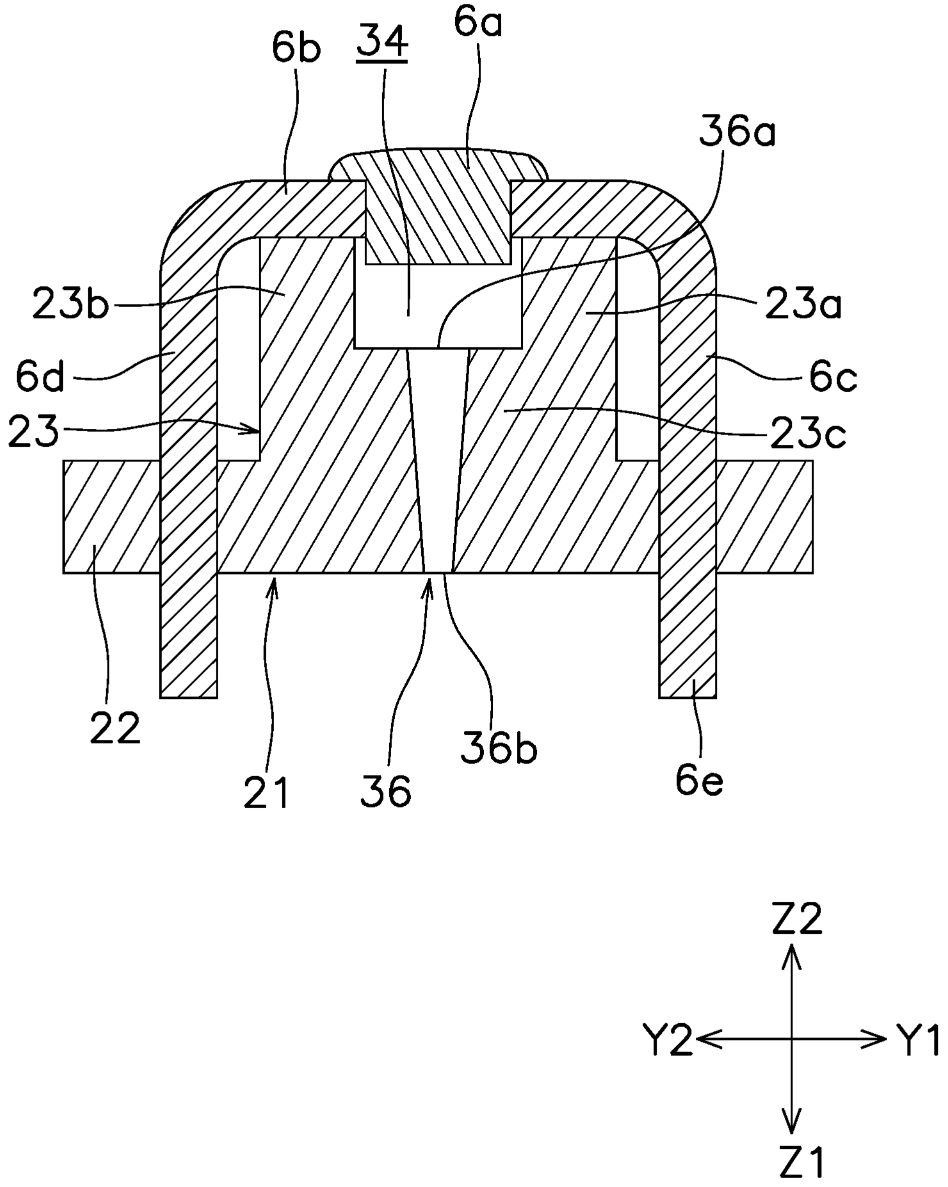
FIG. 7 is a cross-sectional view of the periphery of a terminal support portion according to a modified example.
Figure 8:
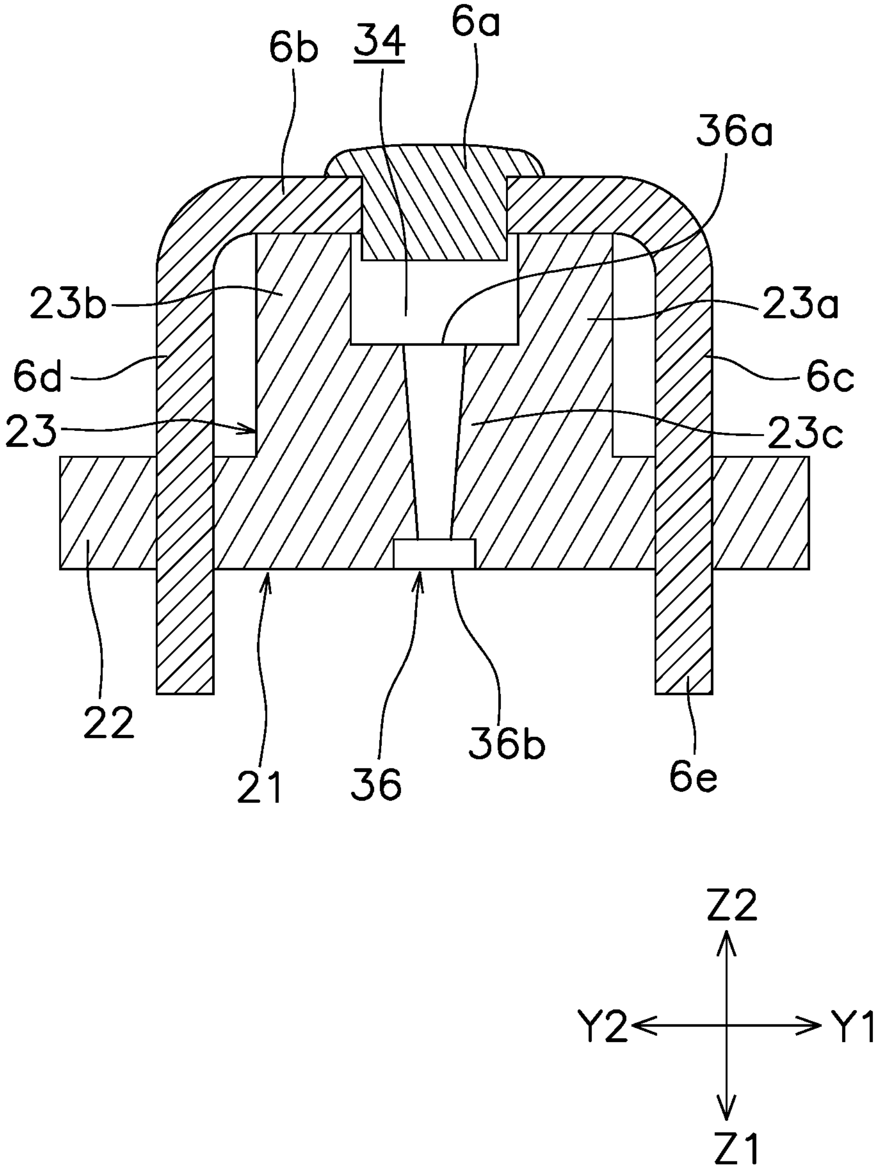
FIG. 8 is a cross-sectional view of the periphery of a terminal support portion according to a modified example.

The shape of the gas passage 36 may be changed. For example, the gas passage 36 may be configured by a rectangular through hole. The gas passage 36 does not necessarily have to overlap with the first fixed contact 6*a* in the up-down direction. As shown in FIG. 6, a plurality of the gas passages 36 may be formed. As shown in FIG. 7, the gas passage 36 may have a shape that tapers from the inflow port 36*a* toward the outflow port 36*b*, or may have a shape that tapers from the outflow port 36*b* toward the inflow port 36*a*. Further, as shown in FIG. 8, the outflow port 36*b* may be formed to have an outer diameter larger than the outer diameter of the inflow port 36*a*.

Figure 9:
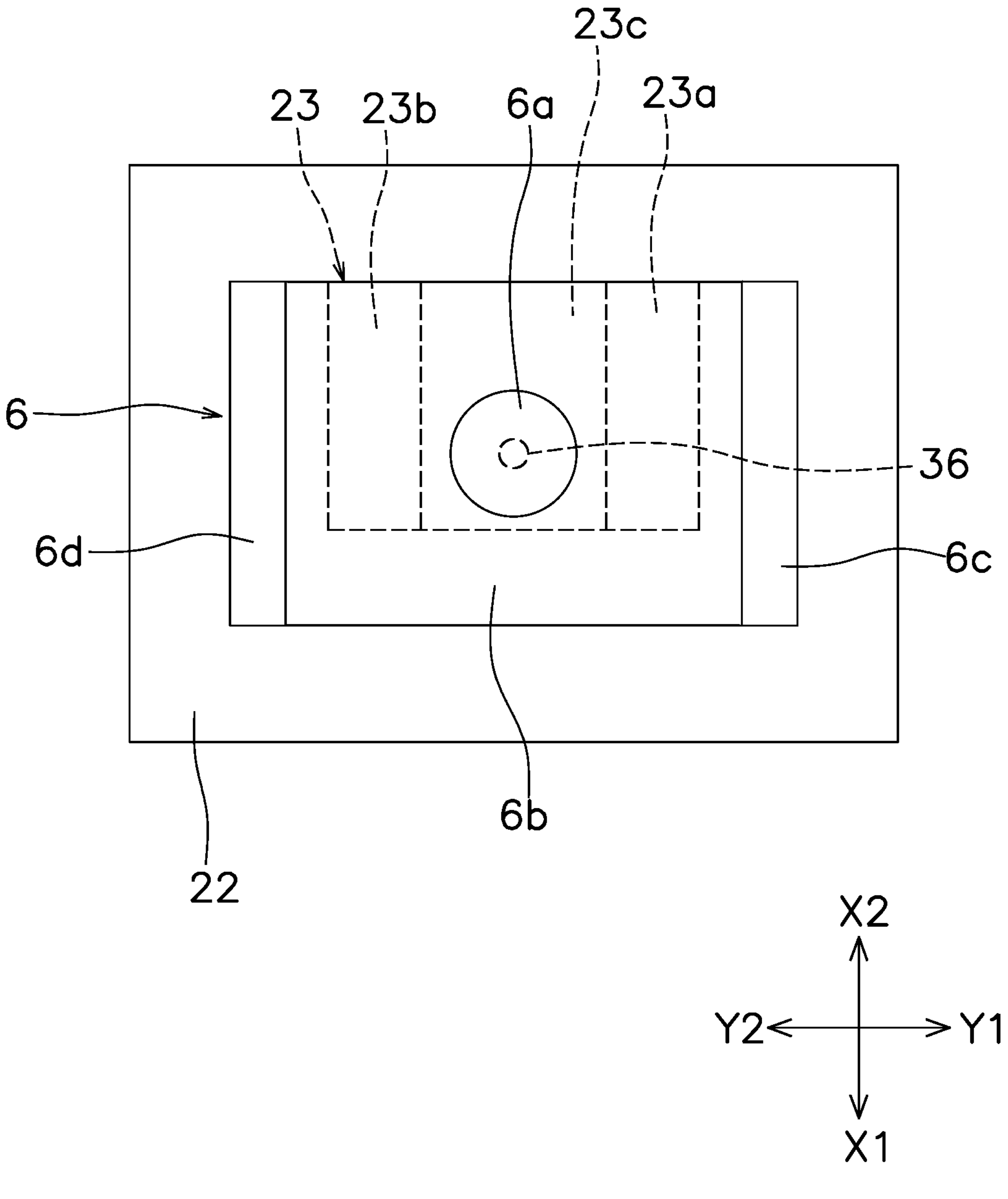
FIG. 9 is a view from above of the periphery of a terminal support portion according to a modified example.
Figure 10:
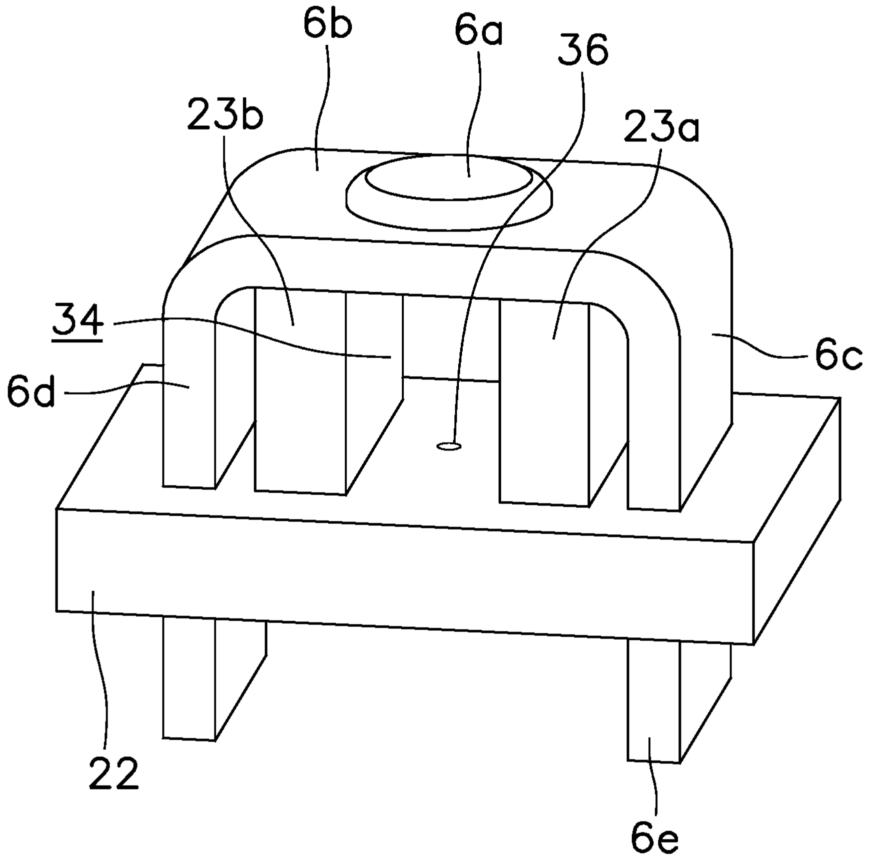
FIG. 10 is a perspective view of the periphery of a terminal support portion according to the modified example.

The shape of the terminal support portion 23 may be changed. As shown in FIG. 9, the terminal support portion 23 does not have to extend to the left-right end portion of the contact support portion 6*b*. In the example shown in FIG. 9, the contact support portion 6*b* protrudes to the left with respect to the terminal support portion 23. As shown in FIG. 10, the connection portion 23*c* of the terminal support portion 23 may be omitted. In this case, the inflow port 36*a* of the gas passage 36 may be disposed at the bottom 22 of the base 21.

The shape of the gas inflow space 34 may be changed. For example, the terminal support portion 23 does not have to open upward. The terminal support portion 23 does not have to be penetrated in the left-right direction, and may be opened only toward the left, for example.

The first magnet 31 and the second magnet 32 may be disposed so as to face each other in the front-rear direction, the same poles may be disposed so as to face each other, and the number of magnets for elongating an arc may be one or three or more. The first magnet 31 and the second magnet 32 are examples of magnets.

Figure 11:
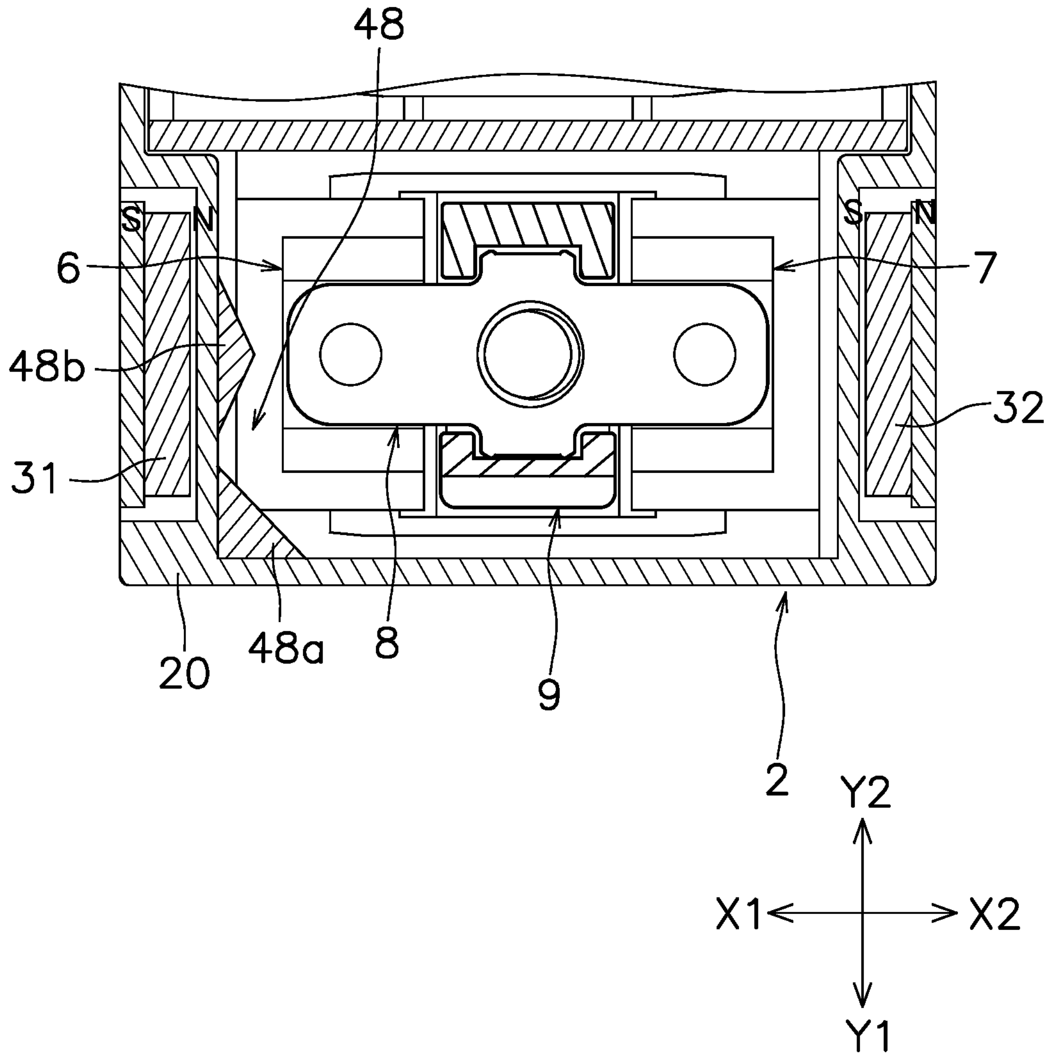
FIG. 11 is a partial cross-sectional view of an electromagnetic relay according to a modified example cut in a plane orthogonal to the up-down direction.

As shown in FIG. 11, the electromagnetic relay 1 may further include a guide member 48 that guides a high-temperature gas arising from an arc to the gas inflow space 34 in a space where an arc generated between the first fixed contact 6*a* and the first movable contact 8*a* is elongated. The guide member 48 may be integrated with the case 2 or may be a separate body. The guide member 48 may include a first guide portion 48*a* and a second guide portion 48*b*. The first guide portion 48*a* and the second guide portion 48*b* protrude from the inside of the case body 20 toward the first fixed terminal 6. The first guide portion 48*a* and the second guide portion 48*b* are inclined with respect to the case body 20. When a forward Lorentz force acts on the arc generated between the first fixed contact 6*a* and the first movable contact 8*a*, the high-temperature gas due to the arc is guided to the gas inflow space 34 by the slope of the first guide portion 48*a* and the slope of the second guide portion 48*b*.

Figure 12:
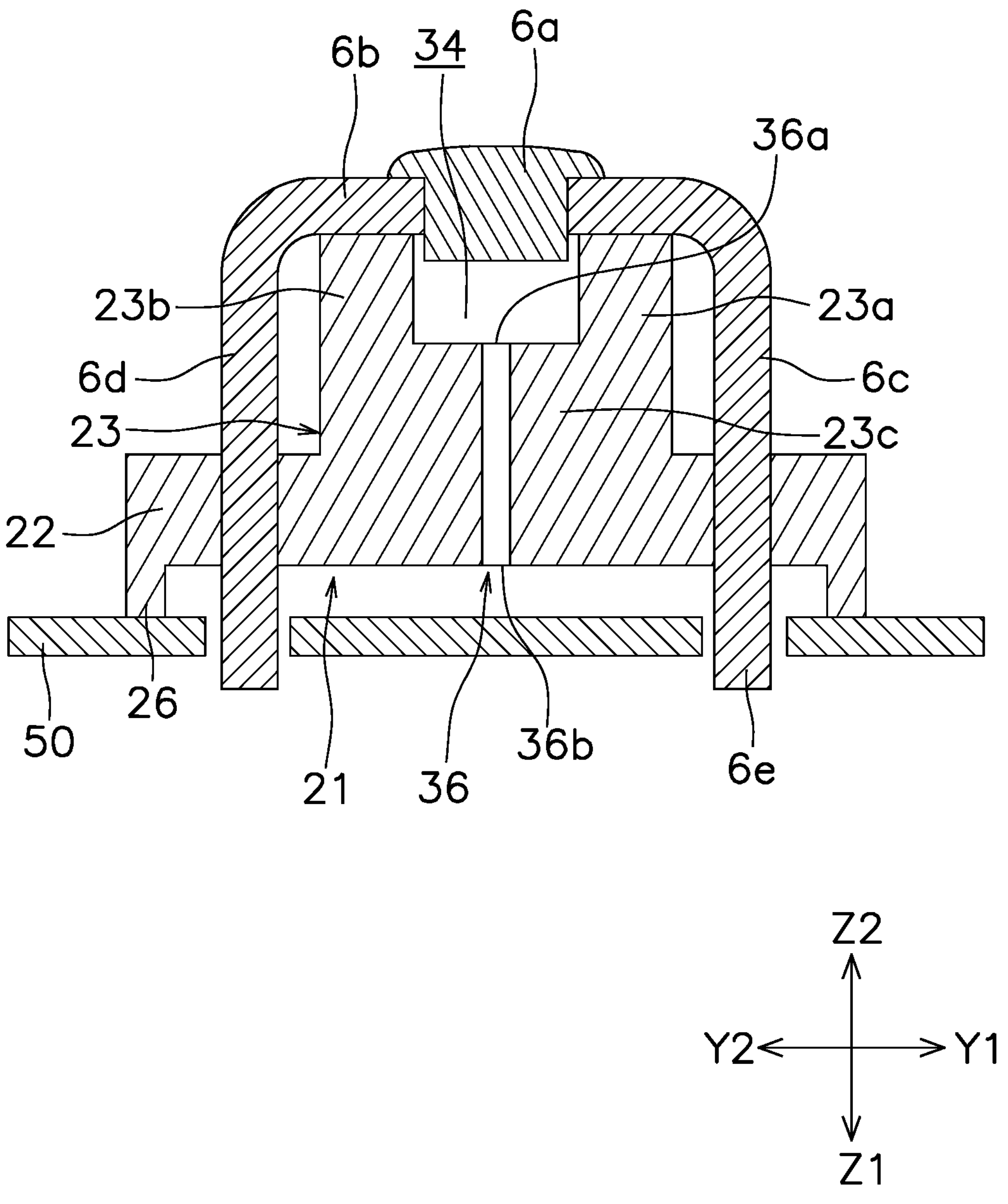
FIG. 12 is a cross-sectional view of the periphery of a terminal support portion according to a modified example.

As shown in FIG. 12, a standoff portion 26 may be formed on the base 21. The standoff portion 26 is formed so as to protrude from the bottom portion 22 of the base 21 toward the external connection portions 6*e*. The standoff portion 26 is disposed with the lower end thereof in contact with the surface of the substrate 50. The standoff portion 26 prevents the outflow port 36*b* of the gas passage 36 from being blocked when the pair of external connection portions 6*e* are connected to an external device.

REFERENCE NUMERALS

1 Electromagnetic relay
2 Case
6 First fixed terminal
6*a* First fixed contact
6*b* Contact support portion
6*c* First extending portion
6*d* Second extending portion
6*e* A pair of eternal connection portions (example of external connection)
6*f* Caulked portion
7 Second fixed terminal
7*a* Second fixed contact
8 Movable contact piece
8*a* First fixed contact
8*b* Second fixed contact
21 Base
26 Standoff portion
34 Gas inflow space
36 Gas passage

The invention claimed is:

1. An electromagnetic relay comprising:

a case including a base with a terminal support portion;

a first fixed terminal supported by the terminal support portion, the first fixed terminal including a first fixed contact disposed apart from the base in a first direction inside the case; a contact support portion disposed between the first fixed contact and the terminal support portion and supporting the first fixed contact; and a first extending portion extending at an angle from the contact support portion and penetrating the base in a penetration direction that is opposite to the first direction;

a movable contact piece including a first movable contact facing the first fixed contact in the penetration direction;

a gas inflow space formed between the terminal support portion and the contact support portion inside the case; and a gas passage penetrating the terminal support portion in the penetration direction and establishing communication between the gas inflow space and an outside of the case;

wherein the gas passage and the gas inflow space are overlapped by the contact support portion of the first fixed terminal when viewed from the penetration direction and are positioned beneath the contact support portion of the first fixed terminal, with the gas passage extending through the terminal support portion.

2. An electromagnetic relay, comprising:

a case including a base;

a first fixed terminal held by the base, the first fixed terminal including a first fixed contact disposed apart from the base in a first direction inside the case, a contact support portion disposed between the first fixed contact and the base and configured to support the first fixed contact, and a first extending portion extending at an angle from the contact support portion and penetrating the base in the first direction;

a movable contact piece including a first movable contact facing the first fixed contact in the first direction;

a gas inflow space formed between the base and the contact support portion inside the case; and a gas passage penetrating the base in the first direction and communicating the gas inflow space with an outside of the case;

wherein the first fixed terminal further includes a second extending portion disposed facing the first extending portion in a second direction orthogonal to the first direction, the second extending portion penetrating the base in the first direction, the contact support portion is disposed between the first extending portion and the second extending portion, and the gas passage is disposed between the first extending portion and the second extending portion.

3. The electromagnetic relay according to claim 1, wherein the first fixed contact includes a caulked portion fixed to the first fixed terminal by caulking, and the caulked portion is disposed in the gas inflow space.

4. The electromagnetic relay according to claim 1, wherein the gas inflow space is open toward a longitudinal direction of the movable contact piece.

5. The electromagnetic relay according to claim 1, wherein the first fixed terminal further includes an external connection portion disposed on the first extending portion outside the case, and the base includes a standoff portion protruding toward the external connection portion.

6. The electromagnetic relay according to claim 1, further comprising a magnet configured to elongate an arc generated between the first fixed contact and the first movable contact in a direction extending from the contact support portion toward the first extending portion.

7. The electromagnetic relay according to claim 1, further comprising a second fixed terminal including a second fixed contact, wherein the movable contact piece further includes a second movable contact facing the second fixed contact in the penetration direction.

* * * * *